United States Patent
Kanbayashi et al.

(10) Patent No.: US 10,627,348 B2
(45) Date of Patent: Apr. 21, 2020

(54) OPTICAL ANALYSIS APPARATUS, OPTICAL ANALYSIS SYSTEM, AND OPTICAL ANALYSIS METHOD

(71) Applicant: Hitachi, Ltd., Chiyoda-ku, Tokyo (JP)

(72) Inventors: Takuya Kanbayashi, Tokyo (JP);
Shinichi Taniguchi, Tokyo (JP);
Akihiro Nojima, Tokyo (JP)

(73) Assignee: Hitachi, Ltd., Tokyo (JP)

(*) Notice: Subject to any disclaimer, the term of this patent is extended or adjusted under 35 U.S.C. 154(b) by 186 days.

(21) Appl. No.: 15/884,231

(22) Filed: Jan. 30, 2018

(65) Prior Publication Data

US 2018/0224374 A1    Aug. 9, 2018

(30) Foreign Application Priority Data

Feb. 7, 2017    (JP) .................................. 2017-020120

(51) Int. Cl.
| | |
|---|---|
| *G01N 21/59* | (2006.01) |
| *G01N 1/28* | (2006.01) |
| *G01N 21/03* | (2006.01) |
| *G01N 21/53* | (2006.01) |

(52) U.S. Cl.
CPC .............. *G01N 21/59* (2013.01); *G01N 1/28* (2013.01); *G01N 21/0303* (2013.01); *G01N 21/534* (2013.01); *G01N 2021/036* (2013.01)

(58) Field of Classification Search
CPC ........ G01N 21/534; G01N 21/59; G01N 1/28; G01N 2021/036; G01N 21/0303
See application file for complete search history.

(56) References Cited

U.S. PATENT DOCUMENTS

| | | | | |
|---|---|---|---|---|
| 3,810,695 | A | * | 5/1974 | Shea ...................... G01N 21/05 356/73 |
| 6,879,741 | B2 | * | 4/2005 | Salerno .............. G01N 21/8507 356/301 |
| 8,379,192 | B2 | * | 2/2013 | Mannhardt ............ G01N 21/15 356/73 |
| 2014/0228604 | A1 | | 7/2014 | Colorado, Jr. et al. |

FOREIGN PATENT DOCUMENTS

JP      2016506989 A1    3/2016

\* cited by examiner

*Primary Examiner* — Hina F Ayub
*Assistant Examiner* — Amanda Merlino
(74) *Attorney, Agent, or Firm* — Procopio, Cory, Hargreaves & Savitch LLP

(57) ABSTRACT

An optical analysis apparatus, that irradiates a liquid sample with light and analyzes the sample, includes a measurement unit that measures the sample, a light source portion that emits light with which the sample is irradiated, and a light receiving portion that receives the light transmitted through the sample. The measurement unit includes a housing provided with an opening portion for flowing in and out of the sample, an accommodation region connected to the opening portion and provided inside the housing, a movable portion provided inside the accommodation region to be movable inside the accommodation region, an irradiation portion which receives the light emitted from the light source portion and in which an inside of the accommodation region is irradiated with the light, and a light collection portion which collects the light transmitted through the sample inside the accommodation region and outputs the light to the light receiving portion.

10 Claims, 11 Drawing Sheets

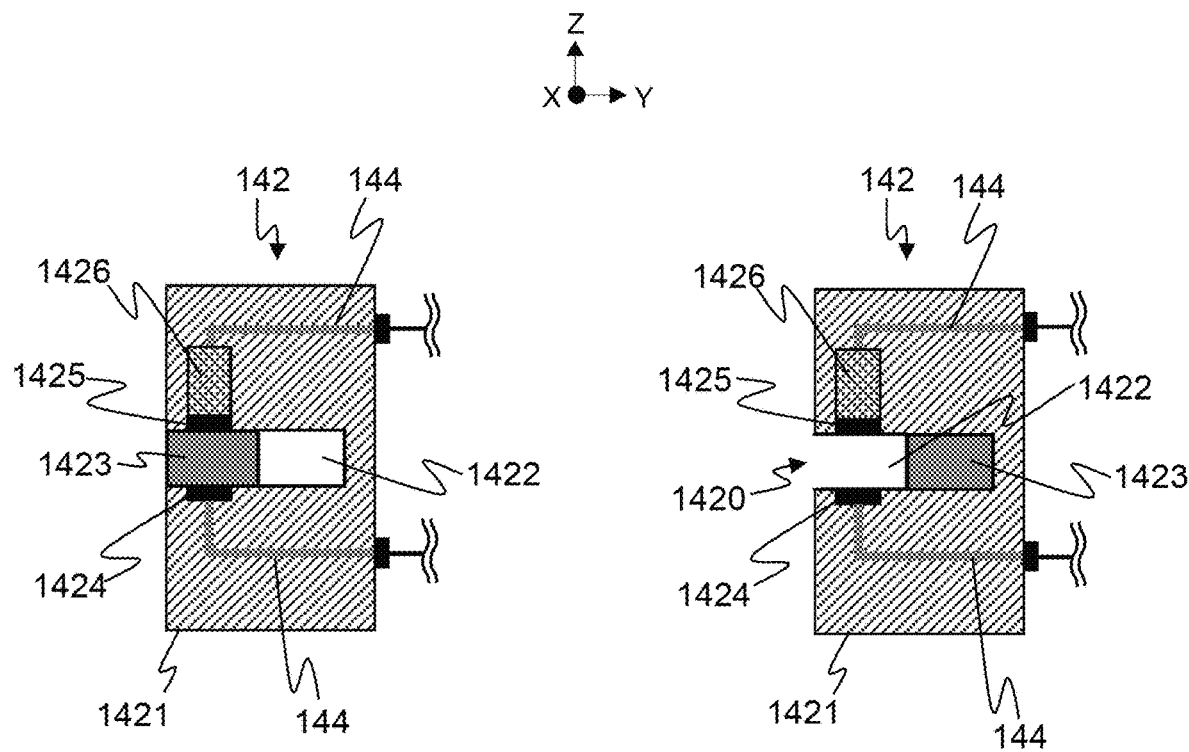
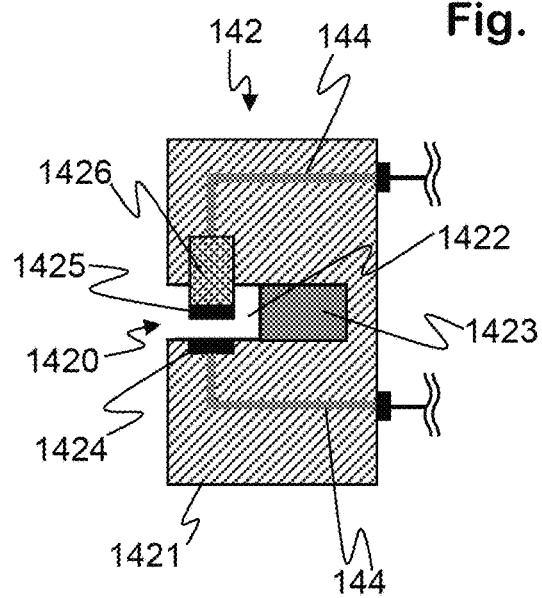
Fig. 2 (a)  Fig. 2 (b)  Fig. 2 (c)

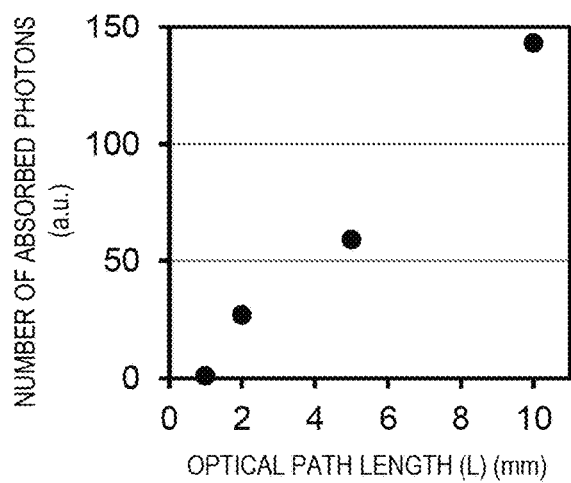
Fig. 5 (a) 0.7µmol/L
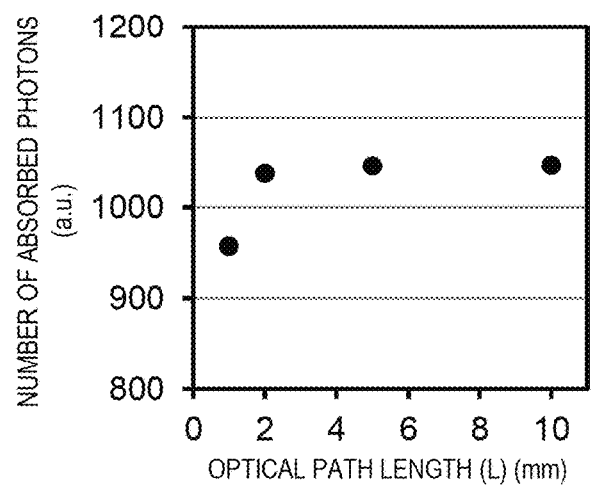
Fig. 5 (b) 0.2mmol/L

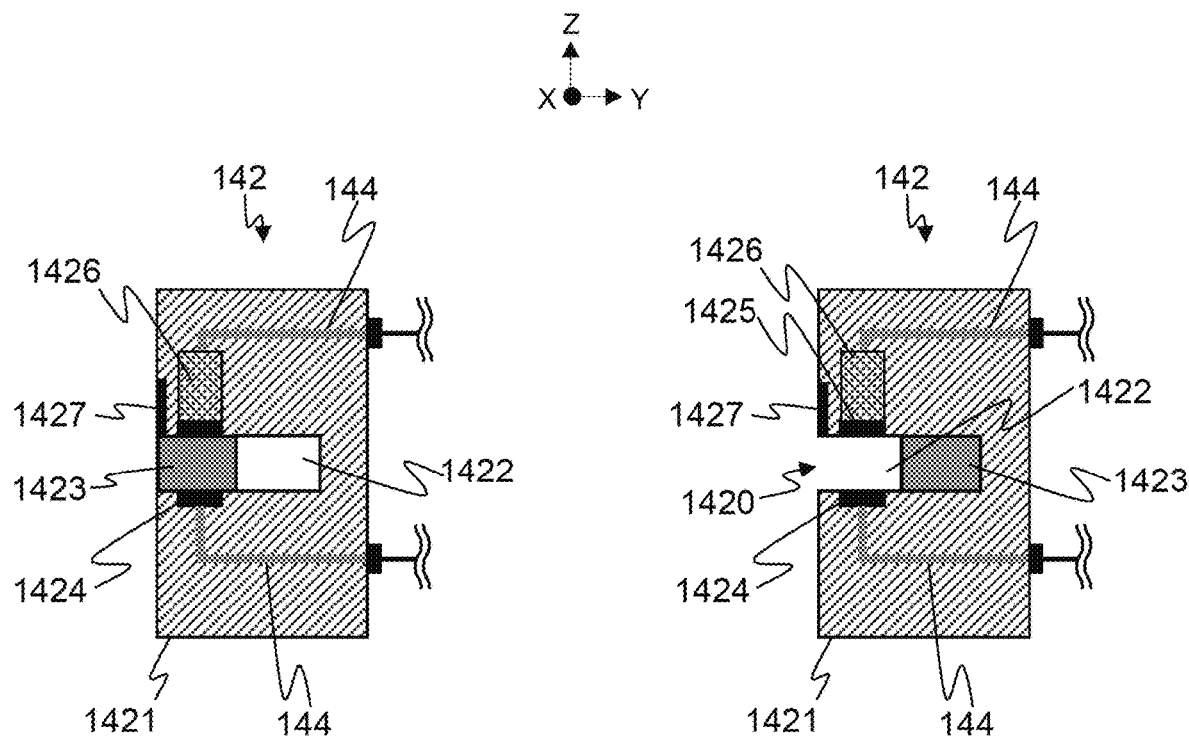
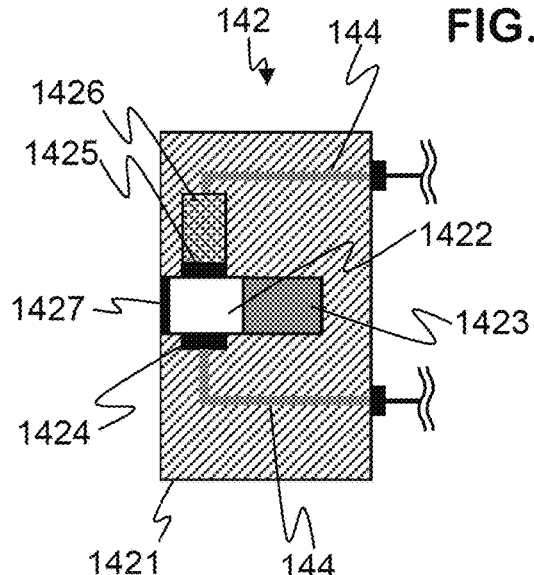
Fig. 7(a)  FIG. 7(b)  FIG. 7(c)

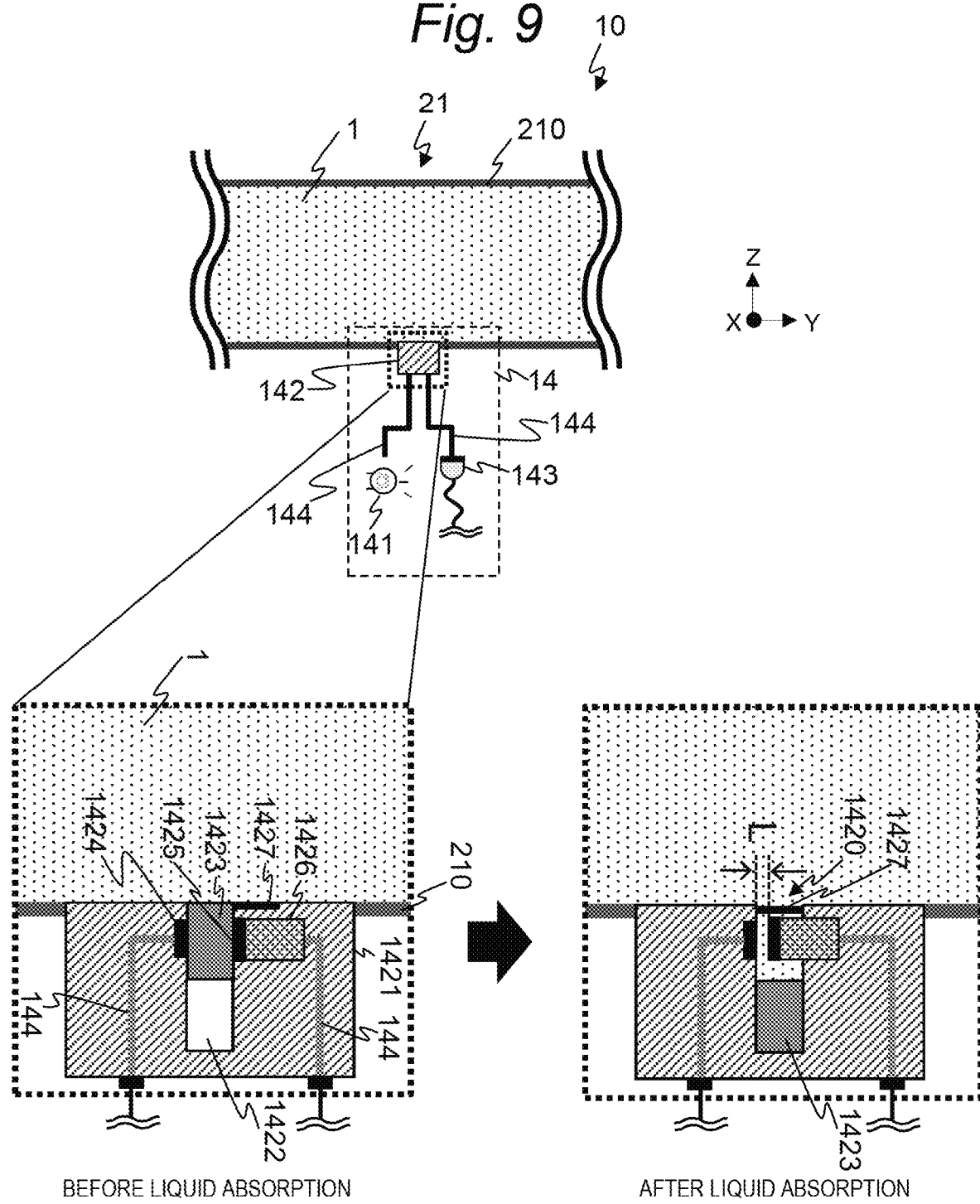

OPTICAL ANALYSIS APPARATUS, OPTICAL ANALYSIS SYSTEM, AND OPTICAL ANALYSIS METHOD

CROSS-REFERENCE TO RELATED APPLICATION

This is application claims priority to a Japanese Patent Application, JP 2017-020120, filed Feb. 7, 2017, the contents of which is incorporated herein by reference in its entirety.

Technical Field

The present invention relates to an optical analysis apparatus, an optical analysis system, and an optical analysis method.

Background Art

In the example in the related art, in order to analyze a liquid sample in a stirring tank during stirring, the liquid sample is sampled from the stirring tank by a bypass connected to the stirring tank, the sampled liquid sample is flowed through an apparatus such as an optical analysis apparatus, and the analyzed liquid sample is drained out of the stirring tank or returned to the stirring tank through another bypass. By regularly analyzing the liquid sample sampled using the bypass, for example, a solute contained in the liquid sample can be analyzed and stirring conditions or polymerization conditions can be adjusted based on the analysis result. In a case where it is required to proceed with a reaction of the liquid sample in a sealed space such as the stirring tank, a state of the liquid sample can be monitored without opening the sealed space by using the above-described method, so that the above-described method is utilized in a wide range of fields.

PTL 1 (JP-T-2016-506989) is cited as an example in the related art related to a method for sampling and analyzing a liquid sample in a stirring tank using a bypass. PTL 1 describes that "a system includes a high-speed flow sampling loop, an enclosure connected to the high-speed flow sampling loop, and a control module disposed in the enclosure. The control module can control sample conditioning and measure a residual concentration of a nitroxide-based polymerization inhibitor in a vinyl monomer substantially in real time."

CITATION LIST

Patent Literature

PTL 1: JP-T-2016-506989

SUMMARY OF INVENTION

Technical Problem

In a measurement method described in PTL 1 above, a liquid sample is sampled by a bypass, flowed through an apparatus such as an optical analysis apparatus, and polymerization conditions are controlled based on an obtained analysis result. However, in a case of monitoring the liquid sample using this method, it is required to provide the bypass and accompanying pump at a plurality of locations, which complicates a structure of a stirring tank. In addition, with this method, it is required to provide an apparatus for conditioning the sampled liquid, and the structure of a system is complicated.

In addition, a concentration and turbidity of the liquid sample cannot be accurately analyzed by optical analysis unless a flow of the liquid sample is stable at a measurement point emitted with light. However, with the method of sampling and flowing through the liquid sample by the bypass, a state of the liquid sample is not stable at the measurement point. Although it is possible to provide an apparatus for conditioning the sampled liquid, the structure of the system is complicated. Furthermore, since the bypass is used, the state of the liquid sample may be different between a sampling point (for example, vicinity of junction of stirring tank and bypass) and the measurement point, which may interfere with accurate analysis.

An object of the invention is to accurately realize optical analysis of a liquid sample in a space such as a stirring tank or a piping with a simple structure.

Solution to Problem

The present application includes a plurality of means for solving at least a part of the above-described problems, and examples of such means are as follows.

An optical analysis apparatus that irradiates a liquid sample with light and analyzes the sample, the apparatus includes a measurement unit that measures the sample, a light source portion that emits light with which the sample is irradiated, and a light receiving portion that receives the light transmitted through the sample. The measurement unit includes a housing provided with an opening portion for flowing in and out of the sample, an accommodation region connected to the opening portion and provided inside the housing, a movable portion provided inside the accommodation region so as to be movable inside the accommodation region, an irradiation portion which receives the light emitted from the light source portion and in which an inside of the accommodation region is irradiated with the light, and a light collection portion which collects the light transmitted through the sample inside the accommodation region and outputs the light to the light receiving portion.

Advantageous Effects of Invention

According to the invention, it is possible to accurately realize optical analysis of the liquid sample in a space such as the stirring tank with a simple structure.

The problems, configurations, and effects other than those described above will be clarified from the description of the following embodiments.

BRIEF DESCRIPTION OF DRAWINGS

FIGS. 2(a)-2(c) is a diagram illustrating a configuration example of a measurement unit according to the first embodiment of the invention.

FIGS. 5(a)-5(b) is a diagram illustrating a result of the experiment example relating to the determination of the optical-path-length.

FIGS. 7(a)-7(c) is a diagram illustrating a configuration example of a measurement unit according to a third embodiment of the invention.

FIG. 9 is a diagram illustrating a configuration example of an optical analysis system and an operation example of a measurement unit according to a fourth embodiment of the invention.

DESCRIPTION OF EMBODIMENTS

Hereinafter, a plurality of embodiments of the invention will be described with reference to drawings. In a description of a configuration of each embodiment, three axes (X, Y, and Z) orthogonal to each other are used for understanding. As a matter of course, even when the configuration of each embodiment does not strictly coincide with the X, Y, and Z axes, it is permissible to change within a range that can achieve substantially the same operational effect.

An optical analysis system according to each embodiment has a configuration for optically analyzing a liquid sample such as a solution containing a solute and a suspension containing a suspended matter. In addition, in an optical analysis step, the solute and the suspended matter contained in the sample can be quantitatively evaluated by analysis such as spectroscopic analysis, fluorescence analysis or the like.

First Embodiment

Figure 1:
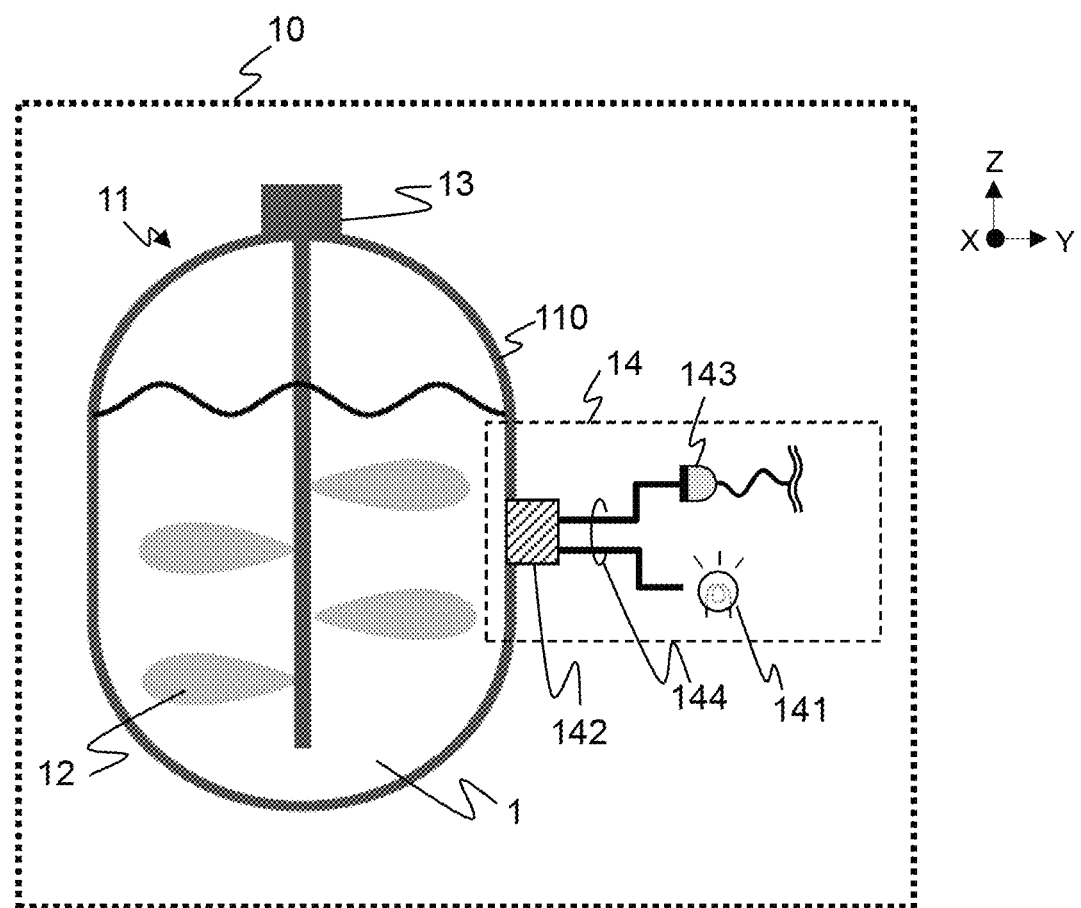
FIG. 1 is a diagram illustrating a configuration example of an optical analysis system according to a first embodiment of the invention.

FIG. 1 is a diagram illustrating a configuration example of an optical analysis system according to a first embodiment of the invention. An optical analysis system 10 is provided with a stirring tank 11 and an optical analysis apparatus 14. In addition, the optical analysis system 10 is provided with a control unit (not illustrated) for controlling the stirring tank 11 and the optical analysis apparatus 14.

The stirring tank 11 accommodates and stirs a sample 1. The stirring tank 11 is provided with one or more stirring blades 12 provided around a rotation shaft and a driving portion 13 including a motor for rotating the rotation shaft.

The optical analysis apparatus 14 takes in the sample 1 from the stirring tank 11, optically analyzes the sample 1, and returns the optically analyzed the sample 1 to the stirring tank 11. The optical analysis apparatus 14 is provided with a light source portion 141, a measurement unit 142, a light receiving portion 143, and a pair of optical transmission portions 144.

The light source portion 141 emits light with which the sample 1 accommodated in the measurement unit 142 is irradiated. The light emitted from the light source portion 141 is transmitted to the measurement unit 142 via one optical transmission portion 144. The light source portion 141 can be realized by using a light emitting element such as a light emitting diode (LED), for example.

The measurement unit 142 is mounted on an outer peripheral wall 110 of the stirring tank 11, and accommodates and measures the sample 1 taken from the stirring tank 11. The measurement unit 142 receives the light emitted from the light source portion 141 via one optical transmission portion 144, the accommodated sample 1 is irradiated with the light, collects the light transmitted through the sample 1, and outputs the light to the light receiving portion 143 via the other optical transmission portion 144. A structure of the measurement unit 142 will be described in detail later.

The light receiving portion 143 receives the light transmitted through the sample 1 accommodated in the measurement unit 142, that is, the light outputted from the measurement unit 142. The light receiving portion 143 outputs an electric signal indicating an intensity of the received light to the control unit. The light receiving portion 143 can be realized by using a light receiving element such as a photodiode, for example.

One optical transmission portion 144 transmits the light from the light source portion 141 to the measurement unit 142. The other optical transmission portion 144 transmits the light from the measurement unit 142 to the light receiving portion 143. These optical transmission portions 144 can be realized by using an optical fiber, for example.

The control unit integrally controls the entire optical analysis system 10. For example, the control unit controls the rotation of the driving portion 13 of the stirring tank 11. In addition, for example, the control unit controls the state of being on or off and intensity of light of the light source portion 141. In addition, for example, the control unit controls a later-described operation of the measurement unit 142. In addition, for example, the control unit controls light reception of the light receiving portion 143. In addition, for example, the control unit performs a process of analyzing a component contained in the sample 1 based on the intensity of the transmitted light output from the light receiving portion 143. For example, the control unit can analyze the concentration, turbidity, absorbance, and the like of the component contained in the sample 1, and analyze the type of the component.

The control unit can be realized by using, for example, a microcomputer including a central processing unit (CPU), a random access memory (RAM) and the like, or a dedicated hardware circuit. The control unit may include, for example, a control circuit for controlling the operations of the stirring tank 11, the light source portion 141, the measurement unit 142, the light receiving portion 143, and the like. The control unit may be provided inside the optical analysis apparatus 14 or outside the optical analysis apparatus 14. The control unit controlling the stirring tank 11 and the control unit controlling the optical analysis apparatus 14 may be separately provided.

FIG. 2 is a diagram illustrating a configuration example of a measurement unit according to the first embodiment of the invention. FIG. 2 illustrates an internal configuration of the measurement unit 142 so as to be visible. The measurement unit 142 is provided with a housing 1421, an accommodation region 1422 (may be called measurement region), a movable portion 1423, an irradiation portion 1424, a light collection portion 1425, and a movable portion 1426.

The housing 1421 is formed in a solid shape such as a rectangular parallelepiped. The housing 1421 is formed to include a material such as synthetic resin, glass, metal, or the like, for example. Inside the housing 1421, a pair of optical transmission portions 144 is inserted, and the accommodation region 1422, the movable portion 1423, the irradiation portion 1424, the light collection portion 1425, and the movable portion 1426 are provided.

The accommodation region 1422 is a hole formed in the housing 1421, and is formed in, for example, a rectangular parallelepiped shape. That is, the accommodation region 1422 is connected to an opening portion 1420 (on XZ plane of housing 1421) formed in the housing 1421. In addition, an opening portion is formed at the outer peripheral wall 110 of the stirring tank 11, and the opening portion 1420 is connected to the opening portion of the outer peripheral wall 110. Therefore, the accommodation region 1422 communicates with the inside of the stirring tank 11, and the sample 1 flows in and out through the opening portion of the outer peripheral wall 110 and the opening portion 1420.

The movable portion 1423 is provided inside the accommodation region 1422 so as to be movable inside the accommodation region 1422. Specifically, the movable portion 1423 is formed with dimensions smaller than that of the accommodation region 1422, is formed, for example, in the shape of a rectangular parallelepiped, and formed to include a material such as synthetic resin, glass, metal, or the like. It is preferable that the area of XZ cross section of the movable portion 1423 is set to be slightly smaller than the area of XZ cross section of the accommodation region 1422 so that an outer peripheral surface of the movable portion 1423 can be brought into contact with or close to an inner peripheral surface of the accommodation region 1422. The movable portion 1423 reciprocally slides along an inner wall surface of the accommodation region 1422 in a direction of closing the opening portion 1420 (−Y direction in FIG. 2) and a direction of opening the opening portion 1420 (+Y direction in FIG. 2). A mechanism for operating the movable portion 1423 is not particularly limited, and for example, the movable portion 1423 can be moved by attracting a magnet provided inside the movable portion 1423 with a magnet provided so as to be movable along the Y axis direction in the housing 1421. The operation of the movable portion 1423 is controlled by the control unit. By opening the opening portion 1420, the sample 1 can be taken from the outside into the accommodation region 1422 via the opening portion 1420. In addition, by closing the opening portion 1420, the sample 1 can be discharged from the inside of the accommodation region 1422 to the outside through the opening portion 1420.

The irradiation portion 1424 is provided at a position facing the light collection portion 1425 on the inner wall surface of the accommodation region 1422. The irradiation portion 1424 is connected to one optical transmission portion 144 inserted in the housing 1421 and emits the light received from the light source portion 141 toward the direction of the light collection portion 1425 (+Z direction in FIG. 2). The irradiation portion 1424 can be realized by, for example, an optical member including an irradiation lens.

The light collection portion 1425 is provided in the movable portion 1426 so as to be disposed in a position facing the irradiation portion 1424 on the inner wall surface of the accommodation region 1422. The light collection portion 1425 is connected to the other optical transmission portion 144 inserted in the housing 1421 and the movable portion 1426, collects light from the inside of the accommodation region 1422, and outputs the collected light to the light receiving portion 143. The light collection portion 1425 can be realized, for example, by the optical member including a condensing lens.

The movable portion 1426 is provided in the housing 1421 so that the light collection portion 1425 is movable. Specifically, the movable portion 1426 is provided on a rear side of the light collection portion 1425 (side opposite to accommodation region 1422), is formed in, for example, a rectangular parallelepiped shape, and is formed to include a material such as synthetic resin, glass, metal, or the like. The movable portion 1426 moves the light collection portion 1425 in a direction closer to the irradiation portion 1424 (−Z direction in FIG. 2) and move the light collection portion 1425 in a direction away from the irradiation portion 1424 (+Z direction in FIG. 2). A mechanism for operating the movable portion 1426 is not particularly limited, and for example, the movable portion 1426 can be moved by attracting a magnet provided inside the movable portion 1426 with a magnet provided so as to be movable along the Z axis direction in the housing 1421. The operation of the movable portion 1426 is controlled by the control unit. As a result, the distance (optical-path-length) between the light collection portion 1425 and the irradiation portion 1424 can be changed. That is, the optical-path-length can be optimized by the control unit according to the physical property value such as the concentration of the solute contained in the sample 1.

FIG. 2(*a*) illustrates a state where the movable portion 1423 is disposed in a position closing the opening portion 1420. FIG. 2(*b*) illustrates a state where the movable portion 1423 moves in the +Y direction and the opening portion 1420 is opened. FIG. 2(*c*) illustrates a state where the movable portion 1426 is moved in the −Z direction so that the optical-path-length is short in a state where the opening portion 1420 is opened.

Figure 3:
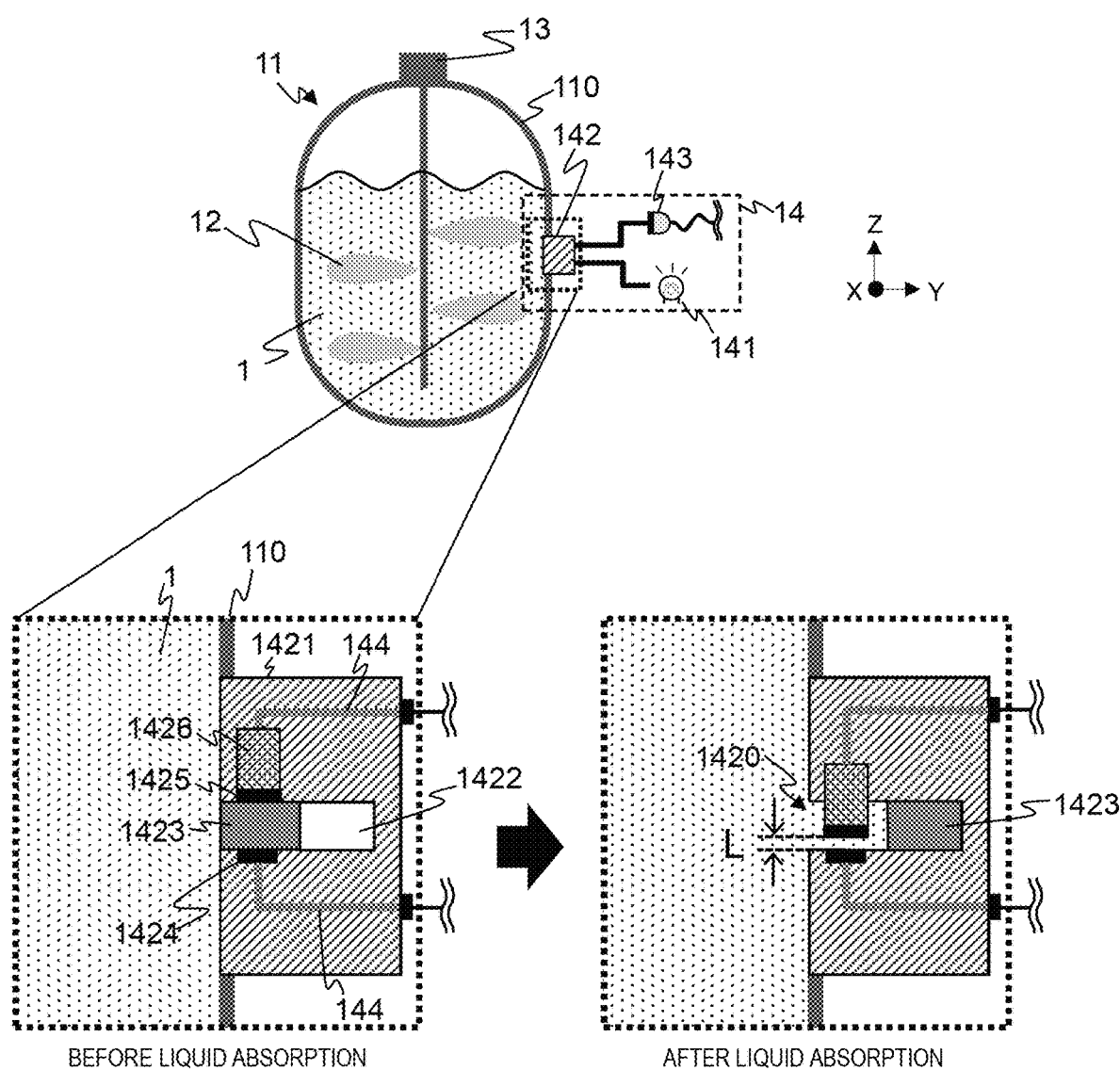
FIG. 3 is a diagram illustrating an operation example of the measurement unit according to the first embodiment of the present invention.

FIG. 3 is a diagram illustrating an operation example of the measurement unit according to the first embodiment of the present invention. The lower part of FIG. 3 illustrates a part of the outer peripheral wall 110 of the stirring tank 11 and the measurement unit 142 mounted thereon in an enlarged manner.

First, the control unit stirs the sample 1 accommodated in the stirring tank 11 by controlling the driving portion 13 to rotate the rotation shaft. Other liquid or the like may be added to the sample 1 and mixed. In an initial state, the opening portion 1420 of the measurement unit 142 is closed. Thereafter, the control unit slides the movable portion 1423 in the +Y direction so that the sample 1 in the stirring tank 11 is absorbed inside the accommodation region 1422 via the opening portion of the outer peripheral wall 110 and the opening portion 1420 of the measurement unit 142. Thereafter, the control unit emits light from the light source portion 141. The light emitted from the irradiation portion 1424 transmits through the sample 1 accommodated in the accommodation region 1422 and reaches the light collection portion 1425. The light collected at the light collection portion 1425 is received by the light receiving portion 143 and optically analyzed by the control unit. Thereafter, the control unit causes the movable portion 1423 to slide in the −Y direction, so that the sample 1 in the accommodation region 1422 is drained into the stirring tank 11 via the opening portion 1420 of the measurement unit 142 and the opening portion of the outer peripheral wall 110.

Incidentally, in a case of spectroscopically analyzing the solute contained in the liquid sample, the sample is disposed between the light source and the light receiving portion, and the light emitted from the light source reaches the light receiving portion after being partially absorbed by the solute when transmitting through the sample. Since the amount and wavelength of light to be absorbed varies depending on the solute, by analyzing the light reaching the light receiving portion, it is possible to clarify the type of solute contained in the sample. In addition, since the amount of absorbed light varies with the amount of solute, by fixing the distance (optical-path-length) through which light transmits, it is possible to quantitatively analyze the solute contained in the sample. In the first embodiment, the distance between the irradiation portion 1424 and the light collection portion 1425 is the optical-path-length (L in the figure), and the solute contained in the sample 1 on the light path in the accommodation region 1422 can be analyzed.

However, the optical-path-length needs to be controlled to an optimum distance according to the concentration of the solute in the sample. For example, in a case where the sample is in a high concentration state containing a lot of solutes scattering light, the light emitted from the light source is scattered and does not reach the light receiving portion, so that spectroscopic analysis cannot be performed. In this case, the optical-path-length is shortened and the number of solutes on the optical path is reduced, so that the light emitted from the light source can reach the light receiving portion.

In addition, for example, in a case where the concentration of solute contained in the sample is too high to completely absorb the light, the amount of light absorbed in the sample on the optical path cannot be accurately measured. On the other hand, in a case where the concentration of solute contained in the sample is too low, the amount of light absorbed by the sample on the optical path is too small, and quantitative analysis cannot be accurately performed. These concentration changes can be quantitatively analyzed by changing the optical-path-length. In other words, in a case where the concentration is high, the optical-path-length is shortened to suppress the amount of light absorbed by the sample, and in a case where the concentration is low, the optical-path-length is lengthened to increase the amount of light absorbed by the sample, and thus the concentration of solute can be quantitatively analyzed.

The optical analysis apparatus 14 according to the first embodiment is provided with a mechanism capable of arbitrarily changing the optical-path-length L in the measurement unit 142. That is, since the movable portion 1426 provided with the light collection portion 1425 is movable along the Z axis direction, the optical-path-length L can be controlled. For example, the control unit moves the movable portion 1426 in the −Z direction to shorten the optical-path-length L in a case where the concentration of the solute is high (higher than the first predetermined criteria), and moves the movable portion 1426 in the +Z direction to lengthen the optical-path-length L in a case where the concentration of the solute is low (lower than the second predetermined criteria) according to a user instruction or program instruction. As a result, the sample can be quantitatively analyzed according to the change in concentration as described above.

An example of an optical analysis processing flow including control of the optical-path-length L in the first embodiment will be described.

(1) The control unit takes in the sample 1 into the accommodation region 1422 by sliding the movable portion 1423 in the +Y direction.

(2) The control unit causes light to be emitted from the light source portion 141 and acquires a spectrum of light incident on the light receiving portion 143.

(3) In a case where the incident light is weak and spectrum cannot be acquired, the control unit slides the movable portion 1426 in the −Z direction (for example, in a case where the absorbance of light in a certain wavelength range exceeds an upper threshold (first predetermined criteria)), and in a case where the incident light is too strong to acquire a spectrum, the control unit slides the movable portion 1426 in the +Z direction (for example, in a case where the absorbance of light in a certain wavelength range is lower than a lower threshold (second predetermined criteria)). The control unit performs optical analysis in a case where an appropriate spectrum of light can be acquired.

(4) The control unit returns the movable portion 1426 to a predetermined initial position (for example, position where movement of movable portion 1423 is not disturbed) and slides the movable portion 1423 in the −Y direction, so that the sample 1 is discharged to the outside of the accommodation region 1422.

Figure 4:
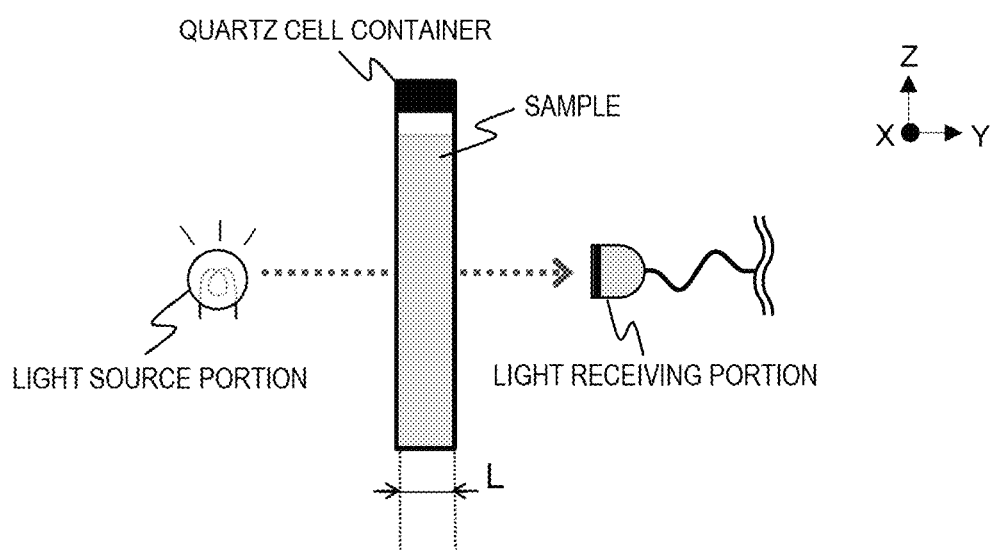
FIG. 4 is a diagram illustrating a configuration of an experiment example relating to determination of an optical-path-length.

FIG. 4 is a diagram illustrating a configuration of an experiment example relating to determination of an optical-path-length. FIG. 5 is a diagram illustrating a result of the experiment example relating to the determination of the optical-path-length. With reference to FIGS. 4 and 5, a reference experimental example relating to determination of the optical-path-length will be described.

In the experimental example, in order to simulate the measurement unit 142, a plurality of quartz cell containers having the different optical-path-length were prepared. In addition, samples were accommodated in each quartz cell container, light source portion and light receiving portion were disposed on both sides of each sample, light transmitted through the sample was measured, and optical analysis was performed.

Specifically, each quartz cell container is formed to include a transparent glass material in the form of a rectangular parallelepiped box, and four quartz cell containers having the distance between the facing XZ surfaces of the inner wall (corresponding to optical-path-length L) of 1 mm, 2 mm, 5 mm, and 10 mm were prepared. On both sides of each quartz cell container in the Y axis direction, the light source portion and the light receiving portion were disposed. The light emitted from the light source portion transmits through the quartz cell container in the Y axis direction and reaches the light receiving portion. In the sample accommodated in each quartz cell container, two types of solutions having different dye concentrations were used. The first solution is ultrapure water in which the dye (rhodamine B) is dissolved, and the dye concentration is 0.7 µmol/L. The second solution is ultrapure water in which the dye (rhodamine B) is dissolved, and the dye concentration is 0.2 mmol/L.

In the experimental example, the first solution was accommodated in each quartz cell container, and the number of photons absorbed by the first solution was measured in each container (that is, optical-path-length). In addition, the second solution was accommodated in each quartz cell container, and the number of photons absorbed by the second solution was measured in each container (that is, optical-path-length). FIG. 5(a) illustrates a graph of analysis results in a case where the dye concentration is 0.7 µmol/L. FIG. 5(b) illustrates a graph of analysis results in a case where the dye concentration is 0.2 mmol/L. In each graph, the vertical axis represents the number of absorbed photons (a.u.), and the horizontal axis represents the optical-path-length L (mm). From these graphs, it is possible to evaluate the optical-path-length dependence of the number of photons absorbed by the solution.

As can be seen from FIG. 5(a), in a case where the optical-path-length is 1 mm, the number of absorbed photons is 0, and it is found that measurement cannot be performed. From this fact, it is considered that it is required to set the optical-path-length to be larger than 1 mm in a case of measuring the dye concentration contained in a solution having a dye concentration of 0.7 µmol/L or less. In addition, as can be seen from FIG. 5(b), when the optical-path-length is 2 mm or more, all the number of absorbed photons is substantially the same as each other, and it is found that accurate measurement cannot be performed. From this fact, it is considered that it is required to set the optical-path-length to be less than 2 mm in a case of measuring the dye concentration contained in a solution having a dye concentration of 0.2 mmol/L or more.

From the above experimental example, in a case of measuring the amount of solute by spectroscopic analysis, it is found that it is required to select the optimum optical-path-length according to the concentration of the target solution.

Hereinbefore, the first embodiment of the invention is described. According to the first embodiment, the optical analysis of the liquid sample in the space such as the stirring tank can be accurately realized with a simple structure. For example, according to the first embodiment, since it is not required to provide a complicated mechanism such as a bypass or a pump in the stirring tank, the optical analysis can be performed with the simple structure. In addition, for example, according to the first embodiment, in order to take the liquid sample into the accommodation region, it is possible to stabilize the state of the liquid sample and to improve the accuracy of optical analysis. In addition, for example, according to the first embodiment, since the sample can be taken into the measurement unit at the arbitrary timing and in a short time from the stirring tank without passing through the bypass, the efficiency and precision of the optical analysis are improved. In addition, for example, according to the first embodiment, since the optical-path-length of light transmitting through the sample taken into the measurement unit can be appropriately changed, the efficiency and precision of optical analysis are improved.

Second Embodiment

In an optical analysis system according to a second embodiment, the point that a measurement unit 142 is mounted on a piping is different from that of the first embodiment. Hereinafter, the differences from the first embodiment will be mainly described.

Figure 6:
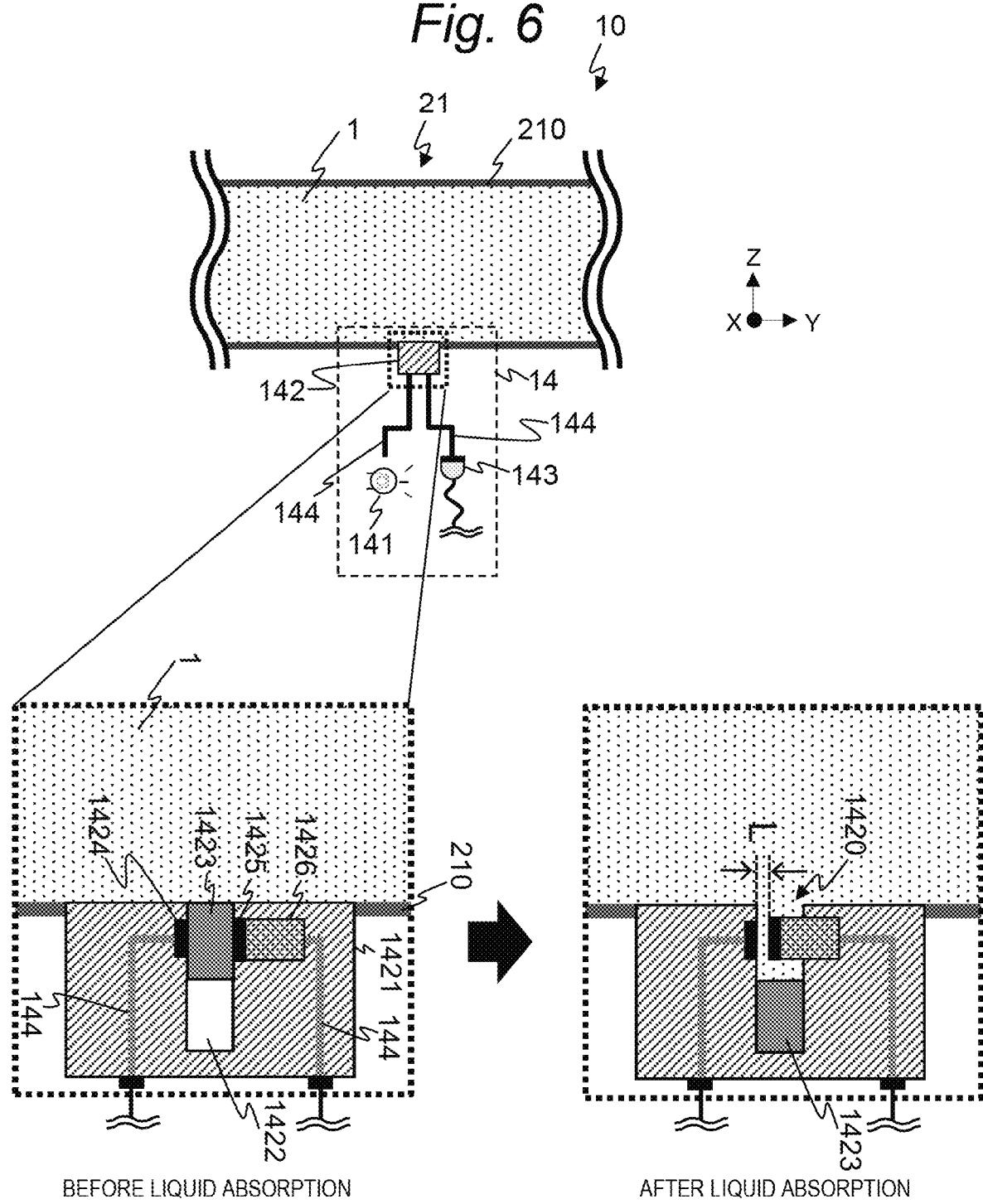
FIG. 6 is a diagram illustrating a configuration example of an optical analysis system and an operation example of a measurement unit according to a second embodiment of the invention.

FIG. 6 is a diagram illustrating a configuration example of the optical analysis system and an operation example of a measurement unit according to the second embodiment of the invention. An optical analysis system 10 is provided with a piping 21 instead of the stirring tank 11. The piping 21 is, for example, a flow path through which a sample 1 flows from one processing system to another processing system.

A measurement unit 142 is mounted on an outer peripheral wall 210 of the piping 21 and accommodates the sample 1 taken from the piping 21. Specifically, an opening portion is formed in the outer peripheral wall 210 of the piping 21, and an opening portion 1420 is connected to the opening portion of the outer peripheral wall 210. Therefore, an accommodation region 1422 communicates with the inside of the piping 21 and the sample 1 is flowed in and out through the opening portion and an opening portion 1420 of the outer peripheral wall 210.

The lower part of FIG. 6 illustrates a part of the outer peripheral wall 210 of the piping 21 and the measurement unit 142 mounted thereon in an enlarged manner. The sample 1 flows in the piping 21. In an initial state, the opening portion 1420 of the measurement unit 142 is closed. Thereafter, the control unit slides a movable portion 1423 in the −Z direction so that the sample 1 in the piping 21 is absorbed inside the accommodation region 1422 via the opening portion of the outer peripheral wall 210 and the opening portion 1420 of the measurement unit 142. Thereafter, the control unit emits light from a light source portion 141. The light emitted from an irradiation portion 1424 transmits through the sample 1 accommodated in the accommodation region 1422 and reaches a light collection portion 1425. The light collected at the light collection portion 1425 is received at a light receiving portion 143 and optically analyzed by the control unit. A movable portion 1426 and the light collection portion 1425 are movable along the Y axis direction by the control unit. Thereafter, the control unit causes the movable portion 1423 to slide in the +Z direction, so that the sample 1 in the accommodation region 1422 is drained into the piping 21 via the opening portion 1420 of the measurement unit 142 and the opening portion of the outer peripheral wall 210.

An example of an optical analysis processing flow including control of the optical-path-length L in the second embodiment will be described.

(1) The control unit takes in the sample 1 into the accommodation region 1422 by sliding the movable portion 1423 in the −Z direction.

(2) The control unit causes light to be emitted from the light source portion 141 and acquires a spectrum of light incident on the light receiving portion 143.

(3) In a case where the incident light is weak and spectrum cannot be acquired, the control unit slides the movable portion 1426 in the −Y direction, and in a case where the incident light is too strong to acquire a spectrum, the control unit slides the movable portion 1426 in the +Y direction. The control unit performs optical analysis in a case where an appropriate spectrum of light can be acquired.

(4) The control unit returns the movable portion 1426 to a predetermined initial position and slides the movable portion 1423 in the +Z direction, so that the sample 1 is discharged to the outside of the accommodation region 1422.

Hereinbefore, the second embodiment of the invention is described. According to the second embodiment, the optical analysis of the liquid sample that has flowed through the piping can be accurately realized with a simple structure. For example, according to the second embodiment, since it is not required to provide a complicated mechanism such as a bypass or a pump in the piping, the optical analysis can be performed with the simple structure. In addition, for example, according to the second embodiment, in order to take the liquid sample into the accommodation region, it is possible to stabilize the state of the liquid sample and to improve the accuracy of optical analysis. In addition, for example, according to the second embodiment, since the sample can be taken into the measurement unit at the arbitrary timing and in a short time from the piping without passing through the bypass, the efficiency and precision of the optical analysis are improved. In addition, for example, according to the second embodiment, since the optical-path-length of light transmitting through the sample taken into the measurement unit can be appropriately changed, the efficiency and precision of optical analysis are improved.

Third Embodiment

In an optical analysis system relating to a third embodiment, a measurement unit 142 is further provided with a shutter. Hereinafter, the differences from the first embodiment will be mainly described.

FIG. 7 is a diagram illustrating a configuration example of a measurement unit according to the third embodiment of the invention. The measurement unit 142 is provided with a shutter 1427. The shutter 1427 is provided in a housing 1421 so as to be able to block an entrance of an accommodation region 1422 (that is, opening portion 1420). In the example of FIG. 7, the shutter 1427 is, for example, a plate-like member and is formed to include a material such as a synthetic resin, a glass, a metal, or the like. The shutter 1427 is provided in the vicinity of the opening portion 1420 so that the operations of a movable portion 1426 and a light collection portion 1425 are not disturbed. The shutter 1427 moves along the Z axis direction so as to open and close the opening portion 1420. A mechanism for operating the shutter 1427 is not particularly limited, and for example, the shutter 1427 can be moved by attracting a magnet provided inside the shutter 1427 with a magnet provided so as to be movable along the Z axis direction in the housing 1421. The operation of the shutter 1427 is controlled by the control unit.

FIG. 7(a) illustrates a state where a movable portion 1423 is disposed in a position closing the opening portion 1420 and the shutter 1427 opens the opening portion 1420. FIG. 7(b) illustrates a state where the movable portion 1423 moves in the +Y direction, the opening portion 1420 is opened, and the shutter 1427 opens the opening portion 1420. FIG. 7(c) illustrates a state where the shutter 1427 blocks the opening portion 1420 in a state where the opening portion 1420 is opened by the movable portion 1423.

Figure 8:
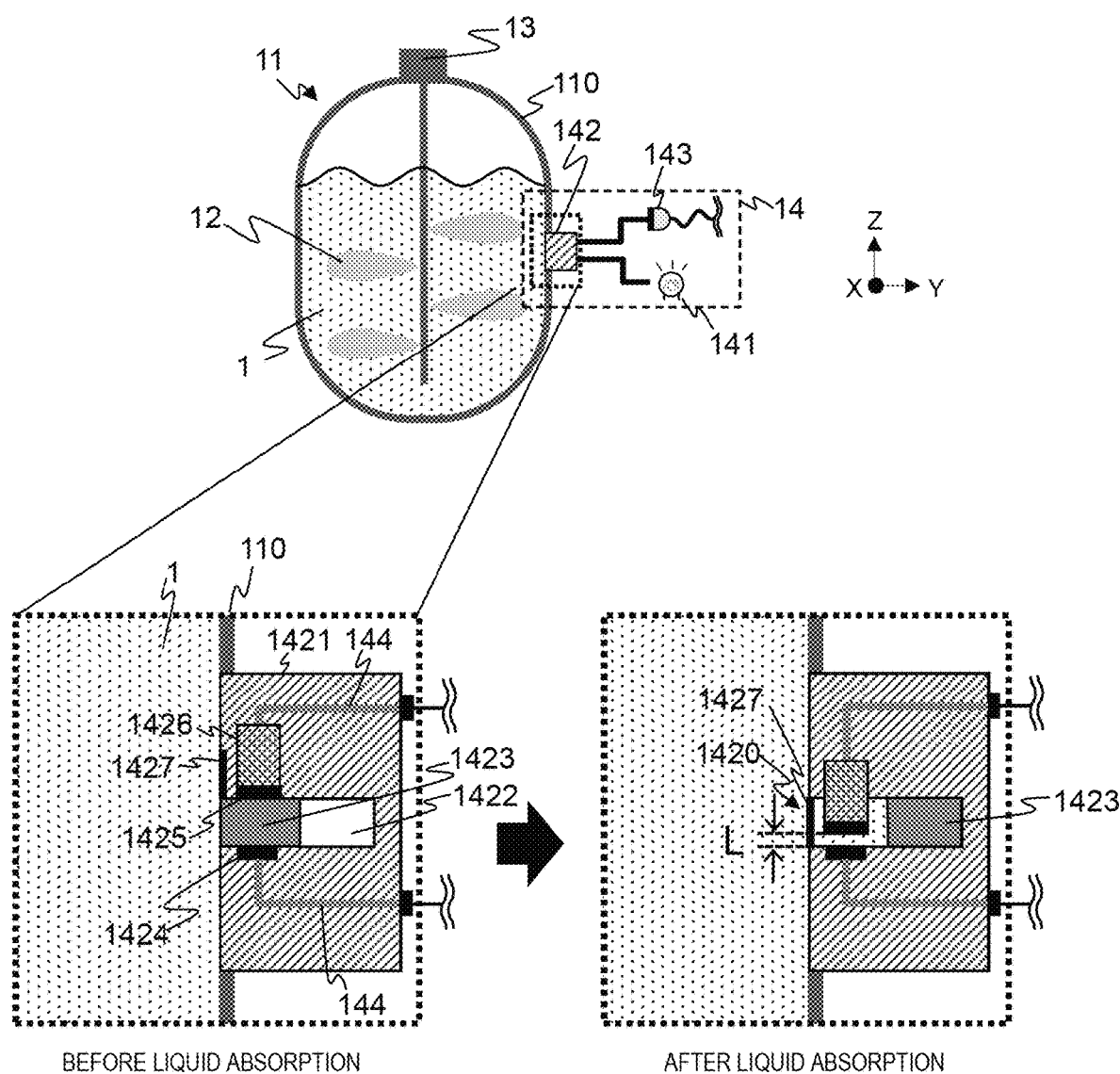
FIG. 8 is a diagram illustrating a configuration example of an optical analysis system and an operation example of the measurement unit according to the third embodiment of the invention.

FIG. 8 is a diagram illustrating a configuration example of an optical analysis system and an operation example of the measurement unit according to the third embodiment of the invention. The lower part of FIG. 8 illustrates a part of an outer peripheral wall 110 of a stirring tank 11 and the measurement unit 142 mounted thereon in an enlarged manner.

First, the control unit stirs the sample 1 accommodated in the stirring tank 11 by controlling a driving portion 13 to rotate the rotation shaft. Other liquid or the like may be added to the sample 1 and mixed. In an initial state, the opening portion 1420 of the measurement unit 142 is not blocked by the shutter 1427, but is closed by the movable portion 1423. Thereafter, the control unit slides the movable portion 1423 in the +Y direction so that the sample 1 in the stirring tank 11 is absorbed inside the accommodation region 1422 via the opening portion of the outer peripheral wall 110 and the opening portion 1420 of the measurement unit 142. Thereafter, the control unit moves the shutter 1427 in the -Z direction so that the opening portion 1420 is blocked and the sample 1 in the accommodation region 1422 is isolated from the outside. Thereafter, the control unit emits light from a light source portion 141. The light emitted from an irradiation portion 1424 transmits through the sample 1 accommodated in the accommodation region 1422 and reaches the light collection portion 1425. The light collected at the light collection portion 1425 is received by the light receiving portion 143 and optically analyzed by the control unit. Thereafter, the control unit moves the shutter 1427 in the +Z direction to open the opening portion 1420. Thereafter, the control unit causes the movable portion 1423 to slide in the -Y direction, so that the sample 1 in the accommodation region 1422 is drained into the stirring tank 11 via the opening portion 1420 of the measurement unit 142 and the opening portion of the outer peripheral wall 110.

An example of an optical analysis processing flow including control of the optical-path-length L in the third embodiment will be described.

(1) The control unit takes in the sample 1 into the accommodation region 1422 by sliding the movable portion 1423 in the +Y direction.

(2) The control unit blocks the opening portion 1420 and isolates the accommodation region 1422 from the stirring tank 11 by moving the shutter 1427 in the -Z direction.

(3) The control unit causes light to be emitted from the light source portion 141 and acquires a spectrum of light incident on the light receiving portion 143.

(4) In a case where the incident light is weak and spectrum cannot be acquired, the control unit slides the movable portion 1426 in the -Z direction, and in a case where the incident light is too strong to acquire a spectrum, the control unit slides the movable portion 1426 in the +Z direction. The control unit performs optical analysis in a case where an appropriate spectrum of light can be acquired.

(5) The control unit opens the opening portion 1420 by moving the shutter 1427 in the +Z direction.

(6) The control unit returns the movable portion 1426 to a predetermined initial position and slides the movable portion 1423 in the -Y direction, so that the sample 1 is discharged to the outside of the accommodation region 1422.

Hereinbefore, the third embodiment of the invention is described. According to the third embodiment, the same effect as in the first embodiment can be obtained. Furthermore, according to the third embodiment, since the accommodation region 1422 and the stirring tank 11 are isolated by the shutter 1427, it is possible to prevent an external influence (influence of flow by stirring) on the sample 1 in the accommodation region 1422. As a result, since the movement of the sample 1 on the optical path is reduced, optical analysis can be performed more accurately. In the first embodiment, since the sample 1 is accommodated in the accommodation region 1422, the movement of the sample 1 on the optical path is reduced, but the movement can be further reduced in the third embodiment.

Fourth Embodiment

An optical analysis system according to a fourth embodiment is different from the third embodiment in that a measurement unit 142 provided with a shutter 1427 is mounted on a piping. Hereinafter, the differences from the third embodiment will be mainly described.

FIG. 9 is a diagram illustrating a configuration example of the optical analysis system and an operation example of a measurement unit according to the fourth embodiment of the invention. An optical analysis system 10 is provided with a piping 21 instead of the stirring tank 11. The piping 21 is, for example, a flow path through which a sample 1 flows from one processing system to another processing system.

The measurement unit 142 is mounted on an outer peripheral wall 210 of the piping 21 and accommodates the sample 1 taken from the piping 21. Specifically, an opening portion is formed in the outer peripheral wall 210 of the piping 21, and an opening portion 1420 is connected to the opening portion. Therefore, an accommodation region 1422 communicates with the inside of the piping 21.

The lower part of FIG. 9 illustrates a part of the outer peripheral wall 210 of the piping 21 and the measurement unit 142 mounted thereon in an enlarged manner. The sample 1 flows in the piping 21. In an initial state, the opening portion 1420 of the measurement unit 142 is not blocked by the shutter 1427, but is closed by a movable portion 1423. Thereafter, the control unit slides the movable portion 1423 in the −Z direction so that the sample 1 in the piping 21 is absorbed inside the accommodation region 1422 via the opening portion of the outer peripheral wall 210 and the opening portion 1420 of the measurement unit 142. Thereafter, the control unit moves the shutter 1427 in the −Y direction so that the opening portion 1420 is blocked and the sample 1 in the accommodation region 1422 is isolated from the outside. Thereafter, the control unit emits light from a light source portion 141. The light emitted from an irradiation portion 1424 transmits through the sample 1 accommodated in the accommodation region 1422 and reaches a light collection portion 1425. The light collected at the light collection portion 1425 is received by a light receiving portion 143 and optically analyzed by the control unit. A movable portion 1426 and the light collection portion 1425 are movable along the Y axis direction by the control unit. Thereafter, the control unit moves the shutter 1427 in the +Z direction to open the opening portion 1420. Thereafter, the control unit causes the movable portion 1423 to slide in the +Z direction, so that the sample 1 in the accommodation region 1422 is drained into the piping 21 via the opening portion 1420 of the measurement unit 142 and the opening portion of the outer peripheral wall 210.

An example of an optical analysis processing flow including control of the optical-path-length L in the fourth embodiment will be described.

(1) The control unit takes in the sample 1 into the accommodation region 1422 by sliding the movable portion 1423 in the −Z direction.

(2) The control unit blocks the opening portion 1420 and isolates the accommodation region 1422 from the piping 21 by moving the shutter 1427 in the −Y direction.

(3) The control unit causes light to be emitted from the light source portion 141 and acquires a spectrum of light incident on the light receiving portion 143.

(4) In a case where the incident light is weak and spectrum cannot be acquired, the control unit slides the movable portion 1426 in the −Y direction, and in a case where the incident light is too strong to acquire a spectrum, the control unit slides the movable portion 1426 in the +Y direction. The control unit performs optical analysis in a case where an appropriate spectrum of light can be acquired.

(5) The control unit opens the opening portion 1420 by moving the shutter 1427 in the +Y direction.

(6) The control unit returns the movable portion 1426 to a predetermined initial position and slides the movable portion 1423 in the +Z direction, so that the sample 1 is discharged to the outside of the accommodation region 1422.

Hereinbefore, the fourth embodiment of the invention is described. According to the fourth embodiment, the same effect as in the second embodiment can be obtained. Furthermore, according to the fourth embodiment, since the accommodation region 1422 and the piping 21 are isolated by the shutter 1427, it is possible to prevent an external influence (influence of flow by flowing through piping) on the sample 1 in the accommodation region 1422. As a result, since the movement of the sample 1 on the optical path is reduced, optical analysis can be performed more accurately. In the second embodiment, since the sample 1 is accommodated in the accommodation region 1422, the movement of the sample 1 on the optical path is reduced, but the movement can be further reduced in the fourth embodiment.

Fifth Embodiment

In an optical analysis system according to a fifth embodiment, a disposition of an irradiation portion 1424 and a light collection portion 1425 of a measurement unit 142 is different from that of the first embodiment. Hereinafter, the differences from the first embodiment will be mainly described.

Figure 10A:
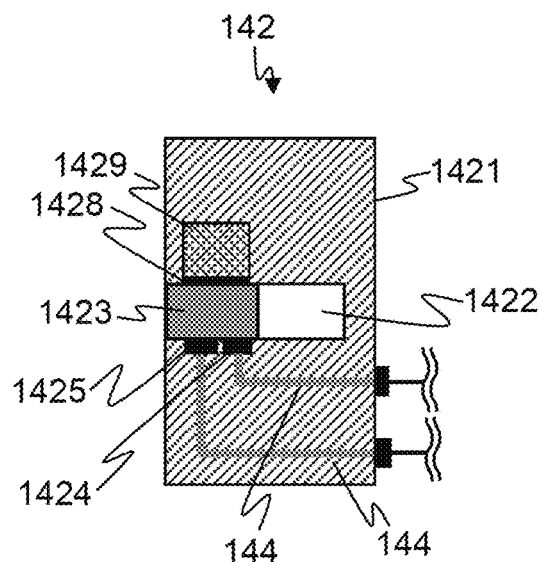
FIGS. 10(a)-10(c) is a diagram illustrating a configuration example of a measurement unit according to a fifth embodiment of the invention.
Figure 10B:
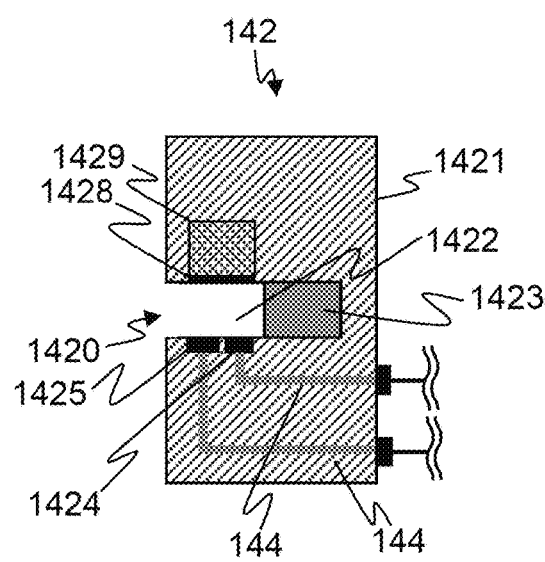
Figure 10C:
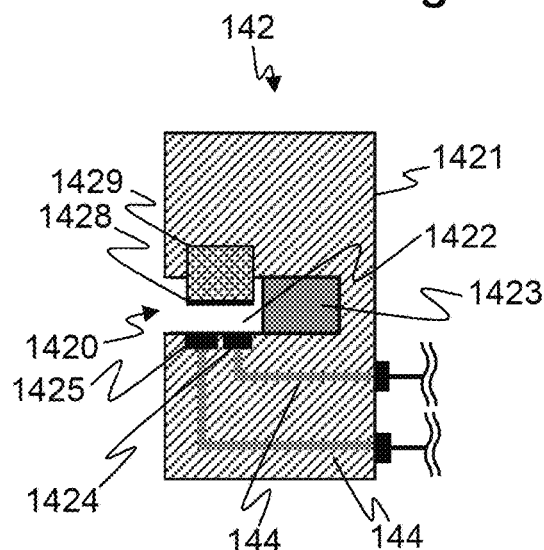

FIG. 10 is a diagram illustrating a configuration example of a measurement unit according to the fifth embodiment of the invention. The measurement unit 142 is provided with a reflection portion 1428, and is provided with a movable portion 1429 instead of the movable portion 1426. Inside a housing 1421, a pair of optical transmission portions 144 are inserted, and an accommodation region 1422, a movable portion 1423, the irradiation portion 1424, the light collection portion 1425, the reflection portion 1428, and the movable portion 1429 are provided.

The irradiation portion 1424 and the light collection portion 1425 are provided on the same surface of the inner wall surface of the accommodation region 1422. The irradiation portion 1424 is connected to one optical transmission portion 144 inserted in the housing 1421 and emits the light received from the light source portion 141 toward the direction of the reflection portion 1428 (+Z direction in FIG. 10). The light collection portion 1425 is connected to the other optical transmission portion 144 inserted in the housing 1421, collects light from the inside of the accommodation region 1422 including the light reflected from the reflection portion 1428, and outputs the collected light to a light receiving portion 143. The irradiation portion 1424 and the light collection portion 1425 may be connected to different optical fibers, for example, or may be configured to be connected to different cores of the multi-core optical fiber.

The reflection portion 1428 is provided in the movable portion 1429 so as to be disposed at a position facing the irradiation portion 1424 and the light collection portion 1425 on the inner wall surface of the accommodation region 1422. The reflection portion 1428 reflects the light emitted from the irradiation portion 1424 towards the light collection portion 1425. The reflection portion 1428 can be realized by a reflecting plate such as a mirror, for example.

The movable portion 1429 is provided in the housing 1421 so that the reflection portion 1428 is movable. Specifically, the movable portion 1429 is provided on a rear side of the reflection portion 1428 (side opposite to accommodation region 1422), is formed in, for example, a rectangular parallelepiped shape, and is formed to include a material such as synthetic resin, glass, metal, or the like. The movable portion 1429 moves the reflection portion 1428 in a direction closer to the irradiation portion 1424 and the light collection portion 1425 (−Z direction in FIG. 10) and move the reflection portion 1428 in a direction away from the irradiation portion 1424 and the light collection portion 1425 (+Z direction in FIG. 10). A mechanism for operating the movable portion 1429 is not particularly limited, and for example, the movable portion 1429 can be moved by attracting a magnet provided inside the movable portion 1429 with a magnet provided so as to be movable along the Z axis direction in the housing 1421. The operation of the movable portion 1429 is controlled by the control unit. As a result, the distance (half of optical-path-length) between the reflection portion 1428 and the irradiation portion 1424, and the reflection portion 1428 and the light collection portion 1425 can be changed. That is, the optical-path-length can be optimized by the control unit according to the physical property value such as the concentration of the solute contained in the sample 1. Twice this distance corresponds to the optical-path-length.

FIG. 10(*a*) illustrates a state where the movable portion 1423 is disposed in a position closing the opening portion 1420. FIG. 10(*b*) illustrates a state where the movable portion 1423 moves in the +Y direction and the opening portion 1420 is opened. FIG. 10(*c*) illustrates a state where the movable portion 1429 is moved in the −Z direction so that the optical-path-length is short in a state where the opening portion 1420 is opened.

Figure 11:
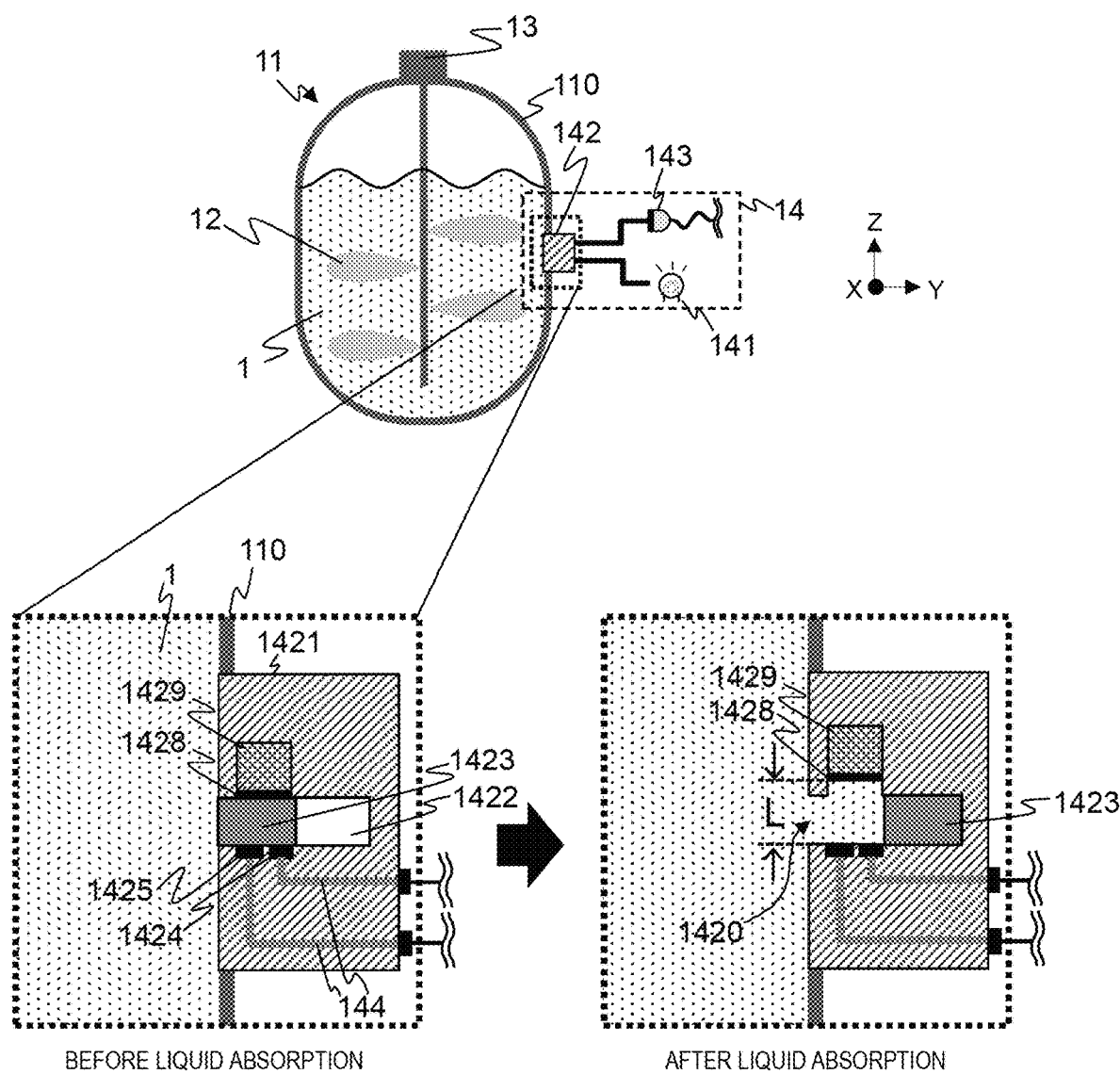
FIG. 11 is a diagram illustrating a configuration example of an optical analysis system and an operation example of the measurement unit according to the fifth embodiment of the invention.

FIG. 11 is a diagram illustrating an operation example of the measurement unit according to the fifth embodiment of the invention. The lower part of FIG. 11 illustrates a part of the outer peripheral wall 110 of the stirring tank 11 and the measurement unit 142 mounted thereon in an enlarged manner.

First, the control unit stirs the sample 1 accommodated in the stirring tank 11 by controlling the driving portion 13 to rotate the rotation shaft. Other liquid or the like may be added to the sample 1 and mixed. In an initial state, the opening portion 1420 of the measurement unit 142 is closed. Thereafter, the control unit slides the movable portion 1423 in the +Y direction so that the sample 1 in the stirring tank 11 is absorbed inside the accommodation region 1422 via the opening portion of the outer peripheral wall 110 and the opening portion 1420 of the measurement unit 142. Thereafter, the control unit emits light from the light source portion 141. The light emitted from the irradiation portion 1424 transmits through the sample 1 accommodated in the accommodation region 1422, is reflected by the reflection portion 1428, and reaches the light collection portion 1425. The light collected at the light collection portion 1425 is received by the light receiving portion 143 and optically analyzed by the control unit. Thereafter, the control unit causes the movable portion 1423 to slide in the −Y direction, so that the sample 1 in the accommodation region 1422 is drained into the stirring tank 11 via the opening portion 1420 of the measurement unit 142 and the opening portion of the outer peripheral wall 110.

An example of an optical analysis processing flow including control of the optical-path-length L in the fifth embodiment will be described.

(1) The control unit takes in the sample 1 into the accommodation region 1422 by sliding the movable portion 1423 in the +Y direction.

(2) The control unit causes light to be emitted from the light source portion 141 and acquires a spectrum of light incident on the light receiving portion 143.

(3) In a case where the incident light is weak and spectrum cannot be acquired, the control unit slides the movable portion 1429 in the −Z direction, and in a case where the incident light is too strong to acquire a spectrum, the control unit slides the movable portion 1429 in the +Z direction. The control unit performs optical analysis in a case where an appropriate spectrum of light can be acquired.

(4) The control unit returns the movable portion 1429 to a predetermined initial position and slides the movable portion 1423 in the −Y direction, so that the sample 1 is discharged to the outside of the accommodation region 1422.

Hereinbefore, the fifth embodiment of the invention is described. According to the fifth embodiment, the same effect as in the first embodiment can be obtained. Furthermore, according to the fifth embodiment, since the irradiation portion 1424 and the light collection portion 1425 can be disposed on the same plane, the structure can be simplified. In addition, unlike the first embodiment, since one end of the optical transmission portion 144 is not inserted in the movable portion 1429, the optical transmission portion 144 does not move, the design can be simplified, and damage due to repetition of the bending operation of the optical transmission portion 144 can be prevented.

In a sixth embodiment, the measurement unit 142 of the fifth embodiment may be mounted on the piping 21 as described in the second embodiment instead of the stirring tank 11.

Hereinbefore, although the invention is specifically described based on a plurality of embodiments, it is needless to say that the invention is not limited to the above-described embodiments, and various modifications can be made without departing from the gist thereof. In addition, the invention is not limited to the embodiments described above, and includes various modified examples. For example, the embodiments described above is described in detail in order to describe the invention in an easy-to-understand manner, and the invention is not necessarily limited to those having all the constituent elements described. In addition, it is possible to replace a part of the configuration of one embodiment with the configuration of another embodiment, and it is possible to add the configuration of another embodiment to the configuration of one embodiment. In addition, for a part of the configuration of each embodiment, it is possible to add, delete, and replace another configuration.

As a specific example, the shutter 1427 of the third embodiment and the fourth embodiment may be provided in the measurement unit 142 of the fifth embodiment and the sixth embodiment.

As another specific example, in the measurement unit 142 of the first to fourth embodiment, the light collection portion 1425 may be fixedly provided on the inner wall surface of the accommodation region 1422 and the movable portion 1426 may be provided on the rear side of the irradiation portion 1424. That is, the movable portion 1426 is provided in the housing 1421 so that the irradiation portion 1424 is movable (optical-path-length can be changed). The movable portions may be provided on the rear sides of the light collection portion 1425 and the irradiation portion 1424, respectively.

As still another specific example, in the measurement unit 142 of the fifth embodiment and the sixth embodiment, the reflection portion 1428 may be fixedly provided on the inner wall surface of the accommodation region 1422, and the movable portions 1429 may be provided on the rear sides of the irradiation portion 1424 and the light collection portion 1425. That is, the movable portion 1429 is provided in the housing 1421 so that the irradiation portion 1424 and the light collection portion 1425 are movable (optical-path-length can be changed). The movable portions may be provided on the rear sides of the reflection portion 1428, the irradiation portion 1424, and the light collection portion 1425, respectively.

As still another specific example, the optical analysis apparatus 14 of each embodiment may have a plurality of sets of the light source portion 141, the measurement unit 142, the light receiving portion 143, and a pair of optical transmission portions 144, and each measurement unit 142 may be mounted at a different position on the outer peripheral wall of the stirring tank 11 or the piping 21. One light source portion 141 and one light receiving portion 143 may be provided in common for the optical transmission portion 14 connected to each of the measurement units 142. In this manner, the optical analysis apparatus 14 can take the sample 1 into the measurement unit 142 at a plurality of locations in the stirring tank 11 or the piping 21 and perform optical analysis.

The invention can be applied not only to optical analysis of a solution but also to optical analysis of a liquid such as a suspension and an emulsion, and of a fluid. The control unit may optimize the optical-path-length according to, for example, the turbidity of a suspension, an emulsion or the like or the concentration of a fluid. In addition, the invention can be applied not only to the stirring tank and the piping, but also to a container for storing the liquid or the fluid to be subjected to optical analysis in general.

In addition, the invention can be provided not only in an optical analysis system and an optical analysis apparatus but also in various aspects such as a stirring tank, a stirring apparatus, a stirring system, a piping, a piping apparatus, a piping system, an optical analysis method, and the like.

REFERENCE SIGNS LIST

1 Sample
10 Optical analysis system
11 Stirring tank
12 Stirring blade
13 Driving portion
14 Optical analysis apparatus
21 Piping
110 Outer peripheral wall
141 Light source portion
142 Measurement unit
143 Light receiving portion
144 Optical transmission portion
210 Outer peripheral wall
1420 Opening portion
1421 Housing
1422 Accommodation region
1423 Movable portion
1424 Irradiation portion
1425 Light collection portion
1426 Movable portion
1427 Shutter
1428 Reflection portion
1429 Movable portion
L Optical-path-length

The invention claimed is:

1. An optical analysis apparatus that irradiates a liquid sample with light and analyzes the sample, the apparatus comprising:
a measurement unit that measures the sample;
a light source portion that emits light with which the sample is irradiated; and
a light receiving portion that receives the light transmitted through the sample,
wherein the measurement unit includes:
a housing provided with an opening portion for flowing in and out of the sample,
an accommodation region connected to the opening portion and provided inside the housing,
a movable portion provided entirely within an inside of the accommodation region so as to be reciprocally movable inside the accommodation region in a direction where the opening portion is opened and in a direction where the opening portion is closed,
an irradiation portion which receives the light emitted from the light source portion and in which an inside of the accommodation region is irradiated with the light, and
a light collection portion which collects the light transmitted through the sample inside the accommodation region and outputs the light to the light receiving portion,
wherein when the opening portion is open, the sample is taken into the inside of accommodation portion, and when the opening portion is closed, the sample is discharged from the inside of the accommodation portion.

2. The optical analysis apparatus according to claim 1, wherein at least one of the irradiation portion and the light collection portion is movably provided in the housing so that the distance between the irradiation portion and the light collection portion can be changed.

3. The optical analysis apparatus according to claim 2, further comprising:
a control unit that controls an optical-path-length between the irradiation portion and the light collection portion by moving at least one of the irradiation portion and the light collection portion,
wherein in a case where a concentration, turbidity, or absorbance of the sample is higher than a first predetermined criteria, the control unit controls so that the optical-path-length is shortened, and in a case where the concentration, turbidity, or absorbance of the sample is lower than a second predetermined criteria, the control unit controls so that the optical-path-length is lengthened.

4. The optical analysis apparatus according to claim 1, further comprising:
a shutter for blocking or opening the opening portion,
wherein the shutter is provided closer to the opening portion side than the movable portion.

5. The optical analysis apparatus according to claim 1, further comprising:
a reflection portion that reflects the light emitted from the irradiation portion,
wherein the reflection portion is provided on an inner wall surface of the accommodation region, and
the irradiation portion and the light collection portion are provided on the inner wall surface of the accommodation region and are disposed at positions facing the reflection portion.

6. The optical analysis apparatus according to claim 5, wherein the reflection portion is movably provided in the housing so as to change a distance to the irradiation portion and the light collection portion.

7. The optical analysis apparatus according to claim 6, further comprising:
a control unit that controls optical-path-lengths between the reflection portion and the irradiation portion, and between the reflection portion and the light collection portion by moving the reflection portion,
wherein in a case where a concentration, turbidity, or absorbance of the sample is higher than a first predetermined criteria, the control unit controls so that the optical-path-length is shortened, and in a case where the concentration, turbidity, or absorbance of the sample is lower than a second predetermined criteria, the control unit controls so that the optical-path-length is lengthened.

8. The optical analysis apparatus according to claim 1, wherein the measurement unit is mounted on a stirring tank or an outer peripheral wall of a piping, and the opening portion is connected to an opening portion provided on the outer peripheral wall.

9. An optical analysis system comprising:

a stirring tank that stirs a liquid sample; and a measurement unit that is mounted on an outer peripheral wall of the stirring tank and measures the sample, wherein the measurement unit includes:

a housing connected to a first opening portion provided on an outer peripheral wall and provided with a second opening portion for flowing in and out of the sample, an accommodation region connected to the second opening portion and provided inside the housing, a movable portion provided entirely within an inside of the accommodation region so as to be reciprocally movable inside the accommodation region in a direction where the opening portion is opened and in a direction where the opening portion is closed, an irradiation portion in which an inside of the accommodation region is irradiated with light, and a light collection portion that collects light transmitted through the sample inside the accommodation region, wherein when the opening portion is open, the sample is taken into the inside of accommodation portion, and when the opening portion is closed, the sample is discharged from the inside of the accommodation portion.

10. An optical analysis system comprising:

a piping through which a liquid sample flows; and a measurement unit that is mounted on an outer peripheral wall of the piping and measures the sample, wherein the measurement unit includes:

a housing connected to a first opening portion provided on the outer peripheral wall and provided with a second opening portion for flowing in and out of the sample, an accommodation region connected to the second opening portion and provided inside the housing, a movable portion provided entirely within an inside of the accommodation region so as to be reciprocally movable inside the accommodation region in a direction where the opening portion is opened and in a direction where the opening portion is closed, an irradiation portion in which an inside of the accommodation region is irradiated with light, and a light collection portion that collects light transmitted through the sample inside the accommodation region, wherein when the opening portion is open, the sample is taken into the inside of accommodation portion, and when the opening portion is closed, the sample is discharged from the inside of the accommodation portion.

\* \* \* \* \*